Sept. 22, 1959     R. I. ROTH     2,905,000

PRESSURE MEASURING MEANS

Filed Nov. 14, 1951     2 Sheets-Sheet 1

INVENTOR
ROBERT I. ROTH
BY Robert S. Dunkan
ATTORNEY

Sept. 22, 1959      R. I. ROTH      2,905,000

PRESSURE MEASURING MEANS

Filed Nov. 14, 1951      2 Sheets-Sheet 2

INVENTOR
ROBERT I. ROTH
BY Robert S. Dunham
ATTORNEY

United States Patent Office 2,905,000
Patented Sept. 22, 1959

2,905,000

PRESSURE MEASURING MEANS

Robert I. Roth, Mount Pleasant, N.Y., assignor to International Business Machines Corporation, New York, N.Y., a corporation of New York Application November 14, 1951, Serial No. 256,311

2 Claims. (Cl. 73—389)

This invention relates to means for measuring and recording a force.

Specifically, the invention relates to mechanism for converting a force such as weight or pressure to a rotational component that is proportional to such force, registering the relative speed of the rotational component, and operating a recording device in response to the registered values.

The invention is based on the concept that the speed of a rotating shaft may be made indicative of a force applied to the device and that the rotational speed of the shaft may be registered and utilized as a control index for the recording operation.

Accordingly the general objectives of the invention are attained in part by providing a primary control mechanism comprising a shaft, a motor for driving the shaft, and means including mechanism influenced by the force being measured for controlling the speed of the motor in proportion to the influencing force. In order that the device for producing the rotational component may be effective for the control of a registering and recording system, there is provided on the shaft means for generating electrical impulses at a frequency proportional to its speed, whereby impulses are produced for energizing a suitable electrical registering and recording system.

Special objects and advantages together with unenumerated features of the invention will become apparent from a reading of the specific description thereof in light of the drawings in which like reference numerals indicate like parts and in which.

Since this device is predicated on the broad concept that the speed of a rotating shaft may be made indicative of a force applied to the device, there has been shown herein two mechanisms, each responsive to a different force. The measurement of forces other than those in the example herein will suggest themselves to those skilled in the art. The force, as for example pressure or weight, applied to the device exerts a force which is balanced by centrifugal force generated by rotating weights. Therefore, the greater the force applied to the device, the greater must be the speed of the rotating weights in order to balance the pressure. In this respect the system is a null system and should have the accuracy inherent in a null system.

Figure 3:
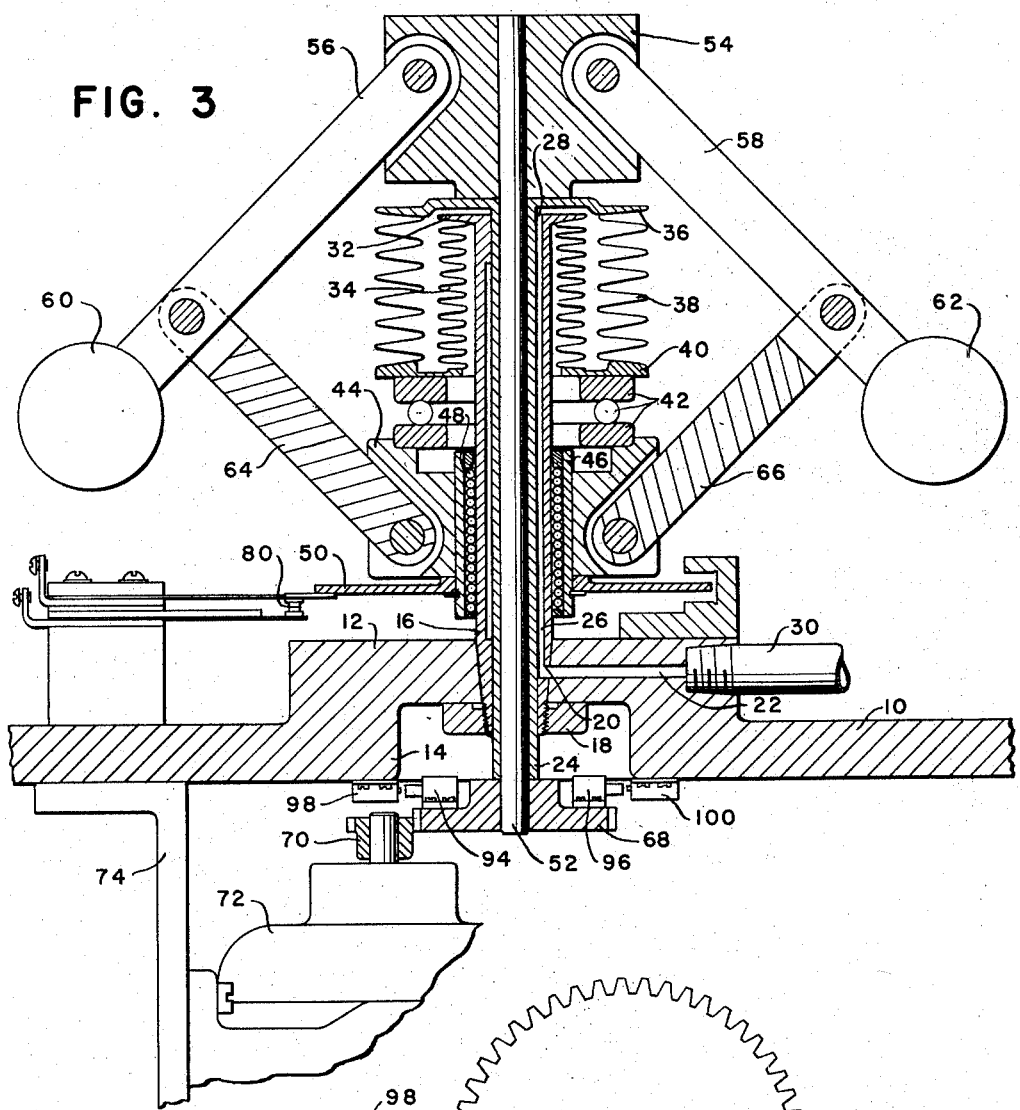
Fig. 3 is a sectional view of a mechanism for controlling the revolution of a shaft in response to a pressure and for generating electrical impulses during revolution of the shaft, the figure showing specific details of construction useful in the devices of Figs. 1 and 2.
Figure 4:
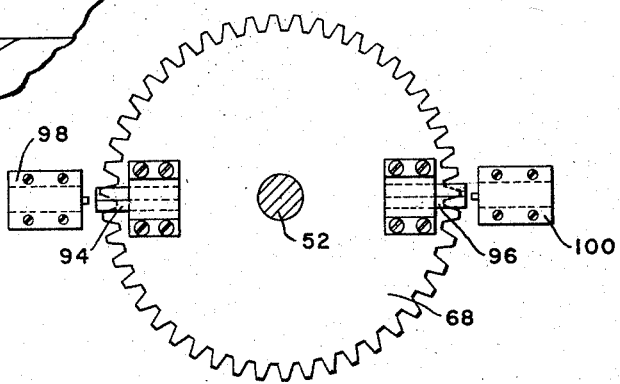
Fig. 4 is a plan view taken from below the base of the mechanism of Fig. 3, and shows the means employed for generating electrical impulses during rotation of the shaft.

The details of both forms of the invention may best be understood by reference to Fig. 3 of the drawings. The mechanism is supported by a base casting 10 which has a raised platform 12 and a corresponding recess 14. A tapered hole in the raised platform 12 receives a vertical tube 16 which is tapered at its lower end to fit the hole. The vertical tube 16 is threaded at its extreme lower end and a nut 18 locks it in place. A passage 20 through the wall of the tube 16 matches a passage 22 drilled through the raised platform 12 of the base casting 10. The tapered fit between the lower end of tube 16 and the base casting 10 is assumed to be pressure tight, and thus the only path to the inside of tube 16 is through the passage 22.

A tube 24 is concentric with tube 16 and forms a pressure-tight fit at top and bottom with the inside of tube 16. Grooves 26 and 28 provide a path along which pressure from any suitable source connected by a conduit 30 may be exerted on the top of the tube 16. The top of the tube 16 has a flange portion 32 to which is fixed the top of a bellows 34. The top of the tube 24 has a flange portion 36 to which is fastened the top of a bellows 38 which encloses the bellows 34. The bellows 34 and the bellows 38 are joined at their bottom by a ring-shaped plate 40. It can be seen how a pressure applied through the grooves 26 and 28 results in a downward force on the plate 40.

The plate 40 rests on a thrust bearing 42 which in turn rests on a collar 44. The collar 44 is fastened to the outer race of a ball bushing 46. The balls 48 of the ball bushing 46 ride on the outer surface of the tube 16. A disc 50 is also fastened to the outer race of the ball bushing 46 directly below the collar 44.

A shaft 52 is journaled in the tube 24 and has fastened to its upper end a collar 54. A pair of links 56 and 58 are pivoted to the collar 54 at their upper ends and carry at their lower ends weights 60 and 62, respectively. A link 64 is pivoted at its upper end to the link 56 and at its lower end to the collar 44. A link 66 is pivoted at its upper end to the link 58 and at its lower end to the collar 44. The links 56 and 58, the balls 60 and 62 and the links 64 and 66 are arranged in a manner similar to the well known fly ball governor.

The shaft 52 has fastened to its lower end a gear 68 which meshes with a gear 70 which is carried by the shaft of a series motor 72, which is mounted on a bracket 74 fastened to the base casting 10. Also meshing with the gear 68 may be a gear 76, which is mounted on the shaft of a direct current generator 78 (see Figs. 1 and 2).

Centrifugal force generated by the rotating weights 60 and 62 will cause an upward force to be exerted through the thrust bearing 42 to the ring-shaped plate 40. In operation, the shaft 52 is rotated by the gearing from the motor 72 and the centrifugal force of the weights is applied upwardly against the plate 40 to balance the downward force exerted by the pressure applied to the bellows by way of the passage 22.

The null position is determined by opening and closing of the contacts 80 which are wired in series with the motor 72. If the pressure applied to the bellows is increased, the normally open contacts 80, Fig. 3, will remain closed until the motor attains a speed at which the rotating weights balance the pressure applied to the bellows. At this point the contacts 80 will open and the circuit to the motor will be broken. The motor will then slow down slightly until the contacts 80 are again closed by downward movement of the disc 50. Closing of the contacts 80 will restore the circuit to the motor causing it to increase slightly in speed. The contacts 80 are repeatedly opened and closed in this manner causing the motor to assume a substantially constant average speed which is a measure of the pressure applied to the bellows. The action of the contacts 80 and the motor 72 is similar to the well known governor controlled series motor.

Figure 1:
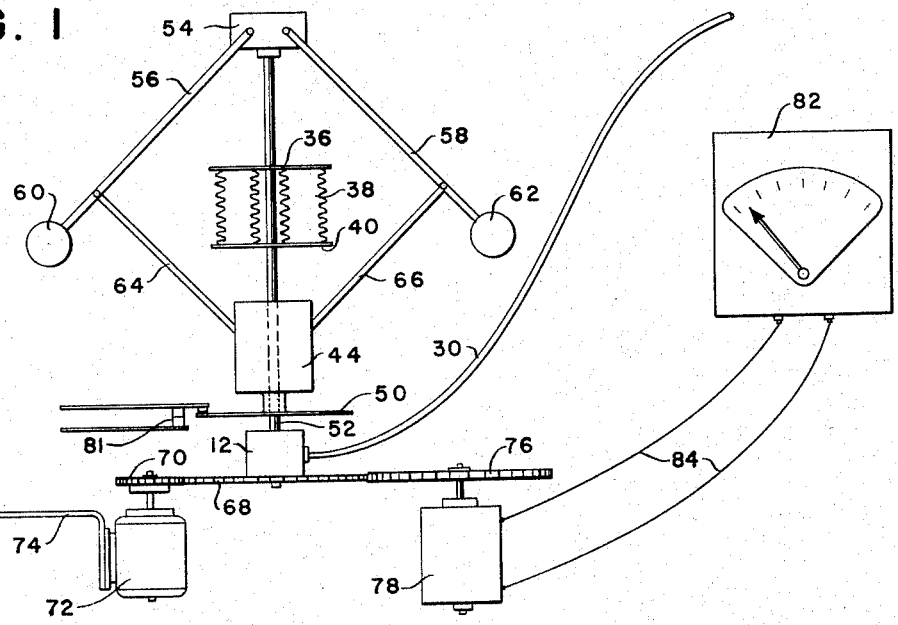
Fig. 1 is a diagrammatic illustration of mechanism for controlling the revolution of a shaft in response to a pressure and for registering the speed of shaft rotation.
Figure 2:
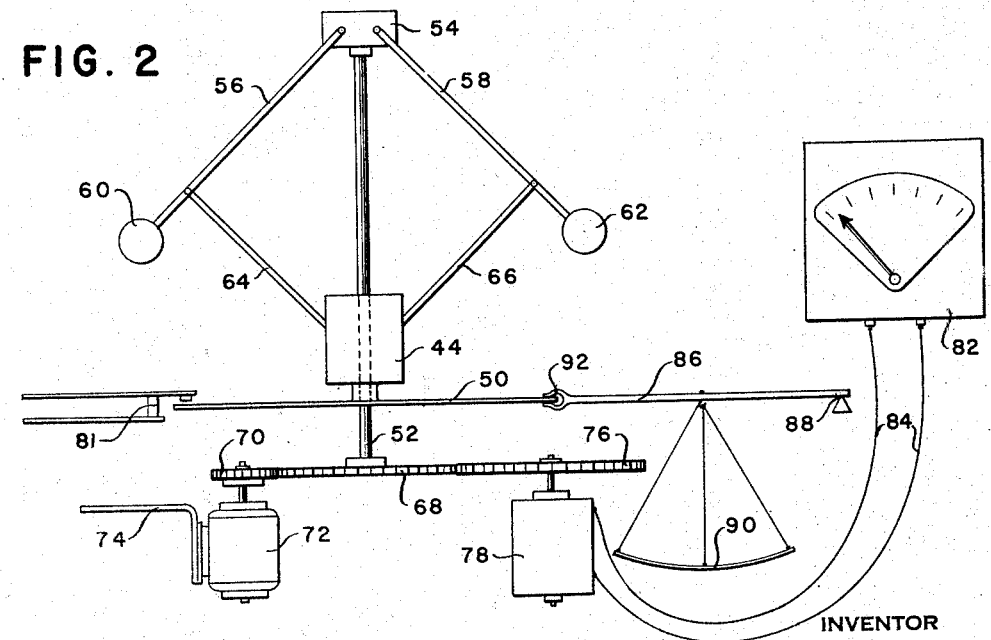
Fig. 2 is a diagrammatic illustration of mechanism for controlling the revolution of a shaft in response to a weight and for registering the speed of shaft revolution.

The direct current generator 78, which in the form shown in Figs. 1 and 2 is geared to the shaft 52, is connected to a voltmeter 82 by means of conductors 84. The scale of the voltmeter may be calibrated to read in pounds per square inch.

The foregoing means for measuring and indicating a force may be applied in other situations, as for example when the force being measured and indicated is a weight. A modified mechanism for this purpose is shown in Fig. 2 of the drawings, wherein the parts corresponding to those already described have applied thereto the same reference numerals. In the first described form of the invention a force in the form of pressure was present to urge the disc 50 downwardly against the centrifugal force generated by the weights 60 and 62.

In the modified form of the invention (see Fig. 2) the force is applied to the disc 50 through a scale beam 86 having a fulcrum point 88 and a scale pan 90 attached to the beam 86. The end of the beam 86 opposite that at which it is fulcrumed has provided therein a bifurcation 92 adapted to embrace the edge of the rotating disc 50. Suitable anti-friction means may be provided to prevent drag on the disc. Accordingly, when a weight is placed on the pan 90, the beam will be depressed about its fulcrum point 88, and the bifurcation 92 of the beam will exert a downward force on the disc 50 in manner similar to the downward force exerted by the pressure described in connection with the first embodiment of the invention. The arrangement shown between the disc 50 and the associated switch is slightly different in Figs. 1 and 2 from the arrangement shown and hereinabove described for the Fig. 3 form of the invention. As shown in Figs. 1 and 2, the extended finger from the switch 81, which corresponds generally to the switch 80 (Fig. 3), is arranged above the disc 50, rather than below it. This arrangement is fully operative on the basis that the switch 81 is normally closed as indicated in Fig. 2, and may be positively opened by upward movement of the disc 50 occasioned by the centrifugal force exerted by the balls 60 and 62 exceeding the downward force effective on the collar 44 incident to the fluid pressure applied between the bellows in the Fig. 1 form of the invention or incident to the weight applied to the scale pan 90 in the Fig. 2 form of the invention.

When the disc 50 is depressed, the contacts 81 which are in the circuit of the motor 72 will close, thereby supplying operating current to the motor, whereby the motor speed is increased with a resultant increase in the centrifugal force generated by the weights 60 and 62. As the centrifugal force increases, the collar 44 will be raised, thereby raising the disc 50 and opening the contacts 81. Repeated opening and closing of the contacts 81 will cause the motor 72 to assume a substantially constant average speed which is proportional to the weight applied to the pan 90, Fig. 2.

In this form of the invention, as in that previously described, the direct current generator 78, which is driven upon rotation of the gear 68, is connected to a voltmeter that may be calibrated to read in terms of pounds.

In order to adapt the measuring device to the generation of pulses for operation of an electronic registering and recording system, the gear 68 at the bottom of shaft 52 has fixed to it two small permanent magnets 94 and 96 in such relation that unlike poles are together at their ends. A pair of stationary pick-up coils 98 and 100 spaced 180° apart are so located that the ends of the permanent magnets sweep past their cores with but a few thousandths of an inch clearance between the ends of the magnets and the cores of the pick-up coils. With this arrangement of magnets and pick-up coils, the principal voltage induced in the pick-up coils will be when the ends of the diametrical line connecting the two magnets pass the cores of the pick-up coils. This voltage can be used as a positive or negative pulse according to the way the coil is connected in a circuit.

While there have been shown and described and pointed out the fundamental novel features of the invention as applied to a plurality of forms of the mechanism for obtaining a rotary component proportional to a force and as applied to a single embodiment of the registering and recording system, it will be understood that various omissions and substitutions and changes in the form and details of the device illustrated and in its operation may be made by those skilled in the art without departing from the spirit of the invention. It is the intention, therefore, to be limited only as required by the scope of the following claims.

What is claimed is:

1. Apparatus for measuring and recording a variable pressure, comprising a rotatable shaft, a gear fixed to one end of said shaft, a variable speed electric motor connected to said gear for continuously rotating said rotatable shaft, a centrifugal governor carried by a collar fixed to said rotatable shaft at a point remote from said gear, an axially movable control member carried by and rotatable with said rotatable shaft, a collar interconnecting said centrifugal governor and said control member whereby said centrifugal governor is adapted to move said control member axially of said rotatable shaft in one direction as the speed of rotation of said rotatable shaft is increased, a double walled bellows comprising a sealed annular chamber surrounding said rotatable shaft and extending into abutting relation with said collars, means for admitting a variable pressure to said chamber for moving said control member axially of said rotatable shaft and in a direction opposite to said one direction, switch means operated by the position of said control member for controlling the supply of electric power to said motor so that said rotatable shaft will be driven by said motor at a speed directly proportional to the magnitude of said variable pressure to be measured, and means to indicate the speed of said rotatable shaft.

2. The invention of claim 1 in which the means to indicate the speed of said rotatable shaft includes a pair of permanent magnets mounted respectively at the opposite ends of the same diameter of said gear, and a pair of fixed coils mounted adjacent and in the plane of rotation of said magnets, whereby output pulses are produced from said coils as said gear is rotated.

References Cited in the file of this patent

UNITED STATES PATENTS

| 1,679,293 | Dawley | July 31, 1928 |
| 1,977,498 | Staegemann | Oct. 16, 1934 |
| 1,993,527 | Mears | Mar. 5, 1935 |
| 1,993,707 | Rosecrans | Mar. 5, 1935 |
| 2,094,196 | Town | Sept. 28, 1937 |
| 2,407,320 | Miller | Sept. 10, 1946 |
| 2,420,013 | Rajchman | May 6, 1947 |
| 2,422,698 | Miller | June 24, 1947 |
| 2,431,591 | Snyder | Nov. 25, 1947 |
| 2,441,468 | Brownscombe | May 11, 1948 |
| 2,509,685 | Hughes | May 30, 1950 |
| 2,516,189 | Dinsmore | July 25, 1950 |
| 2,537,427 | Seid | Jan. 9, 1951 |
| 2,603,123 | Lonkonsky | July 15, 1952 |
| 2,680,241 | Gridley | June 1, 1954 |
| 2,730,698 | Daniels | Jan. 10, 1956 |

FOREIGN PATENTS

| 482,766 | Germany | Sept. 19, 1929 |